United States Patent [19]

Delone

[11] Patent Number: 5,703,329

[45] Date of Patent: Dec. 30, 1997

[54] ELECTRICAL OUTLET SHOCK PROTECTOR

[76] Inventor: Peter B. Delone, 315 Morgan La., Mary Esther, Fla. 32569

[21] Appl. No.: 506,974

[22] Filed: Jul. 28, 1995

[51] Int. Cl.$^6$ ................................................. H02G 3/14
[52] U.S. Cl. ........................................ 174/67; 220/3.8
[58] Field of Search ................................ 174/66, 67, 53; 220/3.8, 241, 242; 292/DIG. 63, DIG. 65, DIG. 11, DIG. 14, DIG. 17

[56] References Cited

U.S. PATENT DOCUMENTS

| | | | |
|---|---|---|---|
| 4,343,411 | 8/1982 | Chesnut et al. | 220/242 |
| 4,508,933 | 4/1985 | Carvel | 174/67 |
| 4,593,541 | 6/1986 | Hollis | 70/57 |
| 4,613,728 | 9/1986 | Lathrop | 174/53 |
| 4,640,564 | 2/1987 | Hill | 339/40 |
| 4,737,599 | 4/1988 | Fontaine | 174/67 |
| 5,218,169 | 6/1993 | Riceman | 174/67 |
| 5,280,135 | 1/1994 | Berlin et al. | 174/67 |

*Primary Examiner*—Kristine L. Kincaid
*Assistant Examiner*—Dhiru R. Patel
*Attorney, Agent, or Firm*—Joseph N. Breaux

[57] ABSTRACT

An electrical outlet shock protector including, a wall plate attachable to an electrical outlet having a first face, the first face having a raised mounting ridge, a plurality of locking prong apertures, and at least one access aperture such that the electrical outlet may be accessed. The device further includes a cover including a top, a plurality of side walls adjoining the top, the side walls having a distal edge opposite the top, an outlet cavity, the outlet cavity having an opening defined by the side walls distal edge. The device also includes a locking mechanism engagable with the wall plate locking prong apertures, the locking mechanism including a plurality of flexible locking prong members and a plurality of release buttons such that the cover may be removably attached to the wall plate thus limiting access to the electrical outlet.

11 Claims, 5 Drawing Sheets

ELECTRICAL OUTLET SHOCK PROTECTOR

TECHNICAL FIELD

The present invention relates to devices for electrical outlet covers and more particularly to devices for electrical outlet covers that include a raised mounting lip and a flexible prong connecting means.

BACKGROUND ART

Residential electrical outlets are inherently dangerous to infants and to those who do not understand the nature of electricity. By there very nature they must be located near the floor where inquisitive infants are predestined to explore. These inevitable encounters between infants and electrical receptacles often result in the infant being shocked which is sometimes fatal. There are numerous devices available to reduce the potential for such a shock. Some shock prevention devices are comprised of plastic plugs which are inserted in the receptacle however these devices will not allow the outlet to be simultaneously in service. Various other devices known in the art cover the outlet but are difficult to remove by an adult as well as an infant limiting there usefulness and application.

It would be a benefit therefore to provide an electrical outlet cover which allows the outlet to be used while the cover is in place and is readily removable by an adult but not a child.

GENERAL SUMMARY DISCUSSION OF INVENTION

It is thus an object of the invention to provide an electrical outlet safety cover to prevent accidental contact with an electrical outlet.

It is a further object of the invention to provide an electrical outlet shock protector which permits the electrical outlet to be in use while the cover is in place.

It is a still further object of the invention to provide an electrical outlet shock protector that is readily removable by adults but not infants or the mentally infirm.

It is a still further object of the invention to provide an electrical outlet shock protector that may be manufactured efficiently and at low cost.

Accordingly, an electrical outlet shock protector having a wall plate, a cover and a locking mechanism for securing the cover to the wall plate is provided. The wall plate is attachable to an ordinary electrical outlet by a screw passing through the center of the wall plate and fastened to the wall receptacle. The wall plate has a first face which is substantially rectangular in shape. The wall plate first face has a raised hollow mounting ridge thereon. The raised mounting ridge has a planer top having a substantially rectangular outer perimeter. The raised mounting ridge prevents lateral movement of the cover with respect to the wall plate with the device in use. The mounting ridge top has a plurality of locking hook receiving apertures such that locking hooks may pass through the mounting ridge top into the hollow interior portion of the mounting ridge and lockingly engage the interior surface of the ridge top. Preferably there are four (4) locking hook receiving apertures, one such aperture positioned at each corner of the mounting ridge top thus maximizing the spacing between receiving apertures. The wall plate first face further includes at least one receptacle access aperture such that the electrical outlet to which the wall plate is attached may be accessed for its intended purpose with the wall plate in place. The access apertures preferably equal in number the outlets to which the wall plate is attached. The wall plate may take many configurations so that single, dual, and quad receptacles as are commonly utilized in homes may be accommodated by the outlet shock protector device.

The cover resembles a rectangular box having an open bottom. The cover has a top and four side walls. The top has a rectangular shape corresponding in size to the wall plate first face. The side walls are perpendicular to the top and form an outlet cavity therein. The side walls have a distal edge opposite the top defining a rectangular outlet cavity opening. In use, the wall plate mounting ridge is inserted into the outlet cavity whereby the side wall distal edges contact the wall plate first face and surround the mounting ridge. Preferably, with the cover in place, the spacing between the side walls of the cover and the mounting ridge of the wall plate is less than one-sixteenths inch ($\frac{1}{16}$"). The cover side walls further include a plurality of release button apertures.

Preferably at least one of the cover side walls has an electric cord passageway therethrough allowing the outlet to be used with the cover assembly in place. The outlet cavity provides space for plugs to remain inserted into the receptacle with the cover in place. Cords exit through the cord passageway.

The outlet shock protector device includes a locking mechanism for securing the cover to the wall plate. The locking mechanism permits the cover to be removed without tools so electrical devices may be either plugged into or removed from the outlet. The locking mechanism includes a plurality of flexible locking prongs and an equal number of release buttons. The release buttons are cylinders having a first and second end. The release button first end has an enlarged circular flange radially extending therefrom. The release button enlarged circular flange will not pass through the side wall release button aperture and is maintained in contact with a locking prong within the outlet cavity between the first and second ends of the locking prongs. A portion of the release buttons pass through the release button apertures. Each release button aperture permits the passage of a portion of a release button. The release buttons are slidable within the release button apertures. Preferably the release buttons apertures are spaced at least three inches (3") apart so that an infant may not simultaneously depress any two release buttons thereby removing the cover assembly.

The locking prongs are flexible planer strips having a first and second end. The flexible locking prongs are attached on their first end to the side walls of the cover within the outlet cavity. The second end of the locking prongs have a free floating hook end which is located outside the outlet cavity and maintained in a first predetermined position. With the hook end in the first predetermined position the flexible prong forces the release button enlarged flange into contact with the side wall through which the release button is disposed. Preferably the locking mechanism has four flexible locking prongs and four release buttons corresponding with four locking hook receiving apertures on the wall plate.

Attachment and removal of the cover to the wall plate requires depression of the release buttons in opposition to the flexible prong members towards the internal cavity. Depression of the release buttons flexes the locking prongs thus shifting the hook ends from the first predetermined locking position to a second predetermined attachment-release position. With each release button so depressed and the locking prong hook ends in the second predetermined attachment-release position the cover side wall distal edges may be placed in contact with the wall plate first face surrounding the mounting ridge and the locking hooks may be inserted into the locking hook receiving apertures. With the release buttons no longer depressed the flexible locking prong urges the release button enlarged flange into contact with the side wall through which the release button passes such that the locking hooks are returned to the first predetermined position. The locking hooks engage the interior surface of the mounting ridge thus securing the cover to the wall plate. Removal of the cover from the wall plate is accomplished in a similar manner. With the cover in place accidental contact with the electrical outlet is prevented. Preferably the entire outlet cover assembly is constructed of nonconducting plastic.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
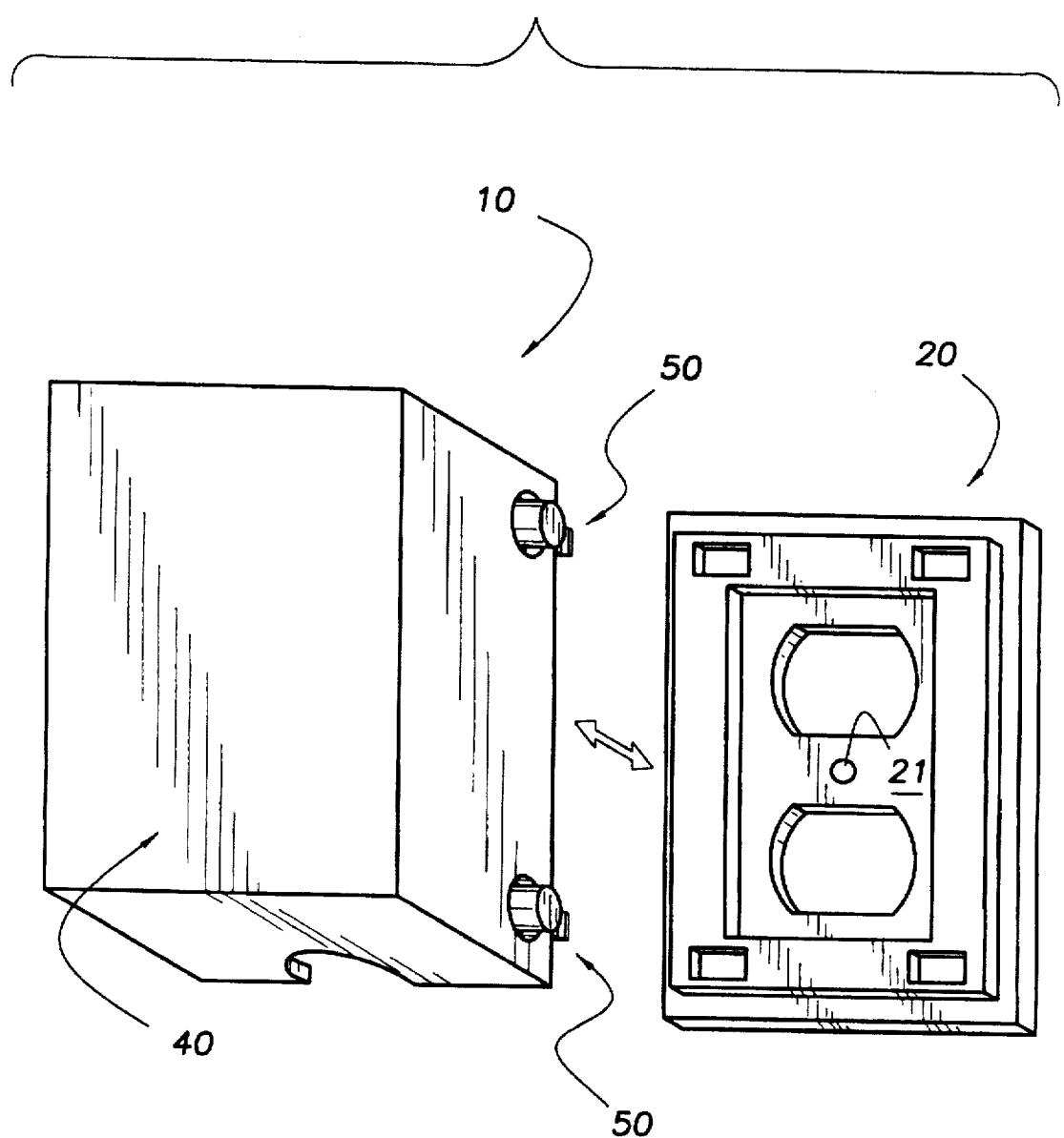
FIG. 1 is a perspective view of an exemplary embodiment of the electrical outlet shock protector.

Referring to the drawings, FIG. 1 depicts an exemplary embodiment of the electric outlet shock protector, generally referenced by the number 10. The outlet shock protector 10 includes a wall plate 20 attachable to an ordinary electrical receptacle in the conventional fashion by a screw passing through an attachment aperture 21. A cover 40 is removably attachable to wall plate 20 by locking means 50 such that access to the receptacle is limited.

Figure 2:
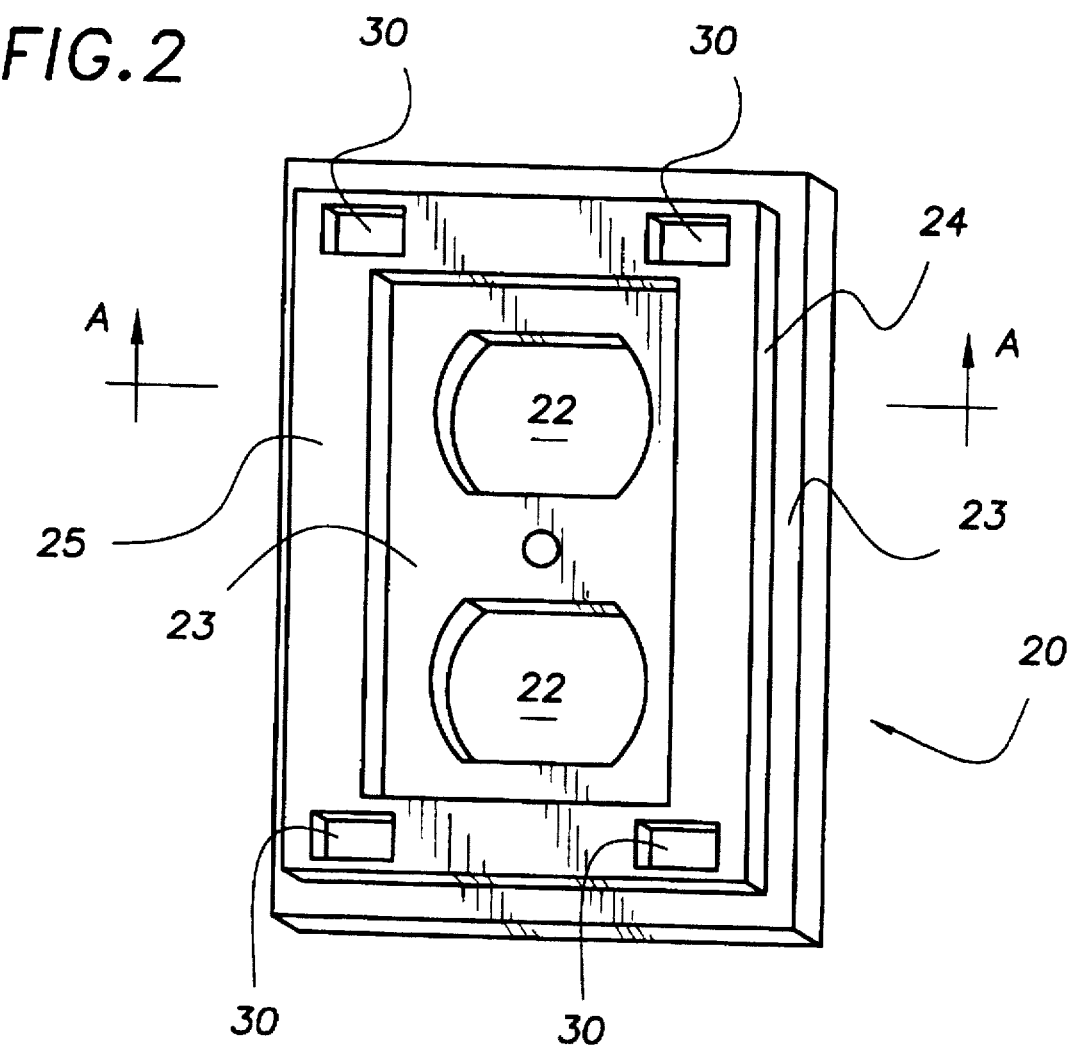
FIG. 2 is a perspective view of the wall plate of the exemplary embodiment of FIG. 1.
Figure 2A:
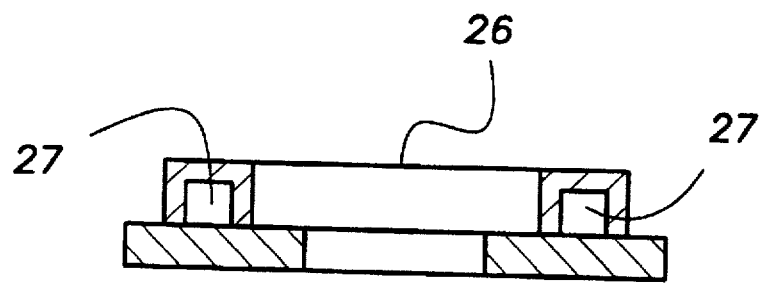
FIG. 2a is a cross sectional view A—A of the wall plate of FIG. 2.

Referring to FIG. 2, an exemplary embodiment of wall plate 20 is shown. In the exemplary embodiment wall plate 20 has two receptacle access apertures 22 through which electric plugs may be inserted into the electric receptacle. Wall plate 20 has a rectangular first face 23 with a hollow raised mounting ridge 24. Raised mounting ridge 24 has a planer top 25 having a rectangular exterior perimeter. Planer top 25 is one-eights inch (⅛") thick plastic having a first exterior surface 26 and a second interior surface 27 (FIG. 2a). Mounting ridge top 25 has four (4) rectangular locking hook receiving apertures 30 located at the corners of mounting ridge 24.

Figure 3:
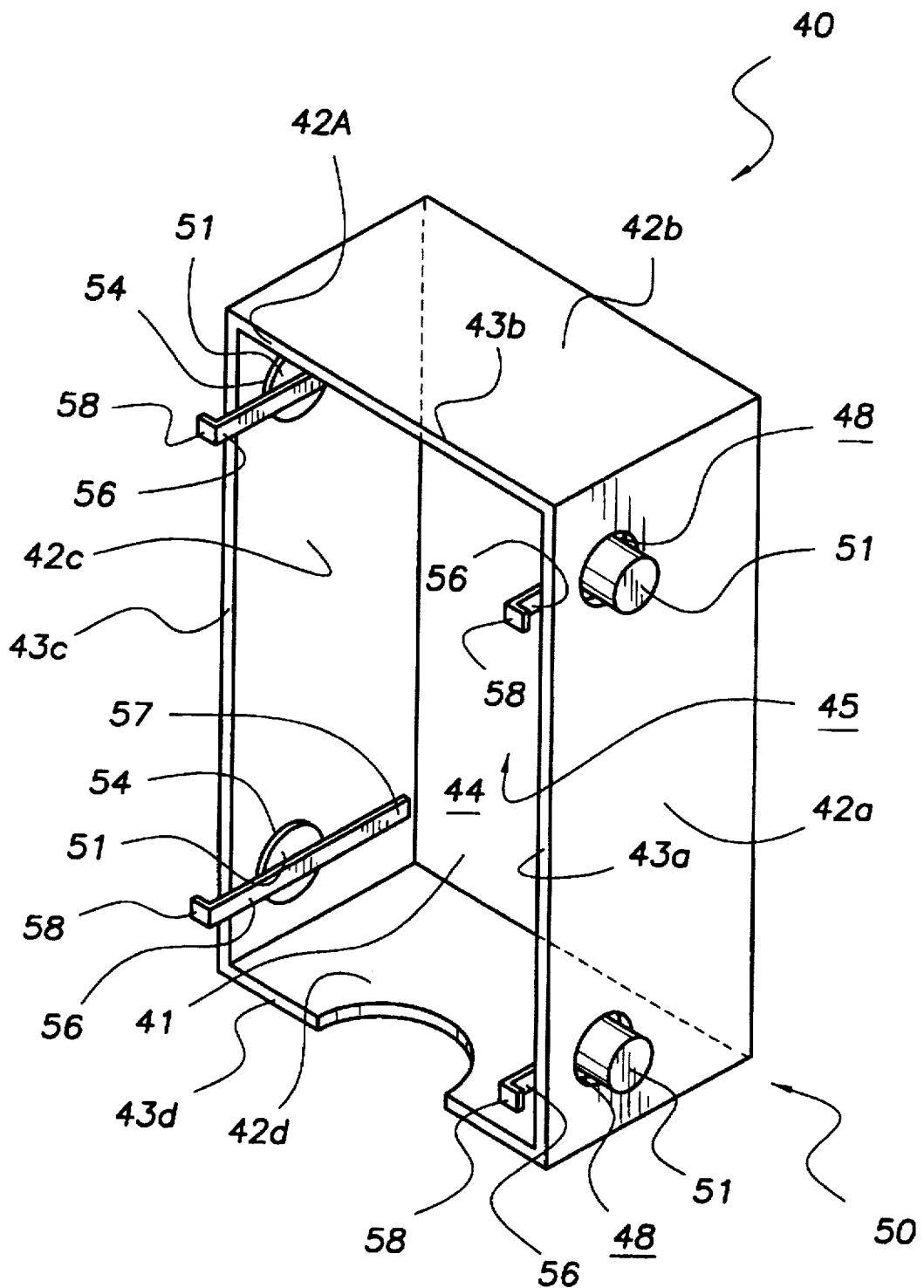
FIG. 3 is a perspective view of the cover and the locking mechanism of the exemplary embodiment of FIG. 1.

Referring to FIG. 3, an exemplary embodiment of cover assembly 40 and locking mechanism 50 is shown. Cover assembly 40 includes four (4) side walls 42a, 42b, 42c, and 42d perpendicularly adjoining a top 41 to form an open rectangular box having an internal outlet cavity 44. Side walls 42a, 42b, 42c, and 42d have a corresponding distal edge 43a, 43b, 43c, and 43d which define a rectangular outlet cavity opening 45. Mounting ridge 24 (FIG. 2) is insertable within outlet cavity 44. Side walls 42a, and 42c each have two circular release button apertures 48 therethrough (two not shown).

Figure 4:
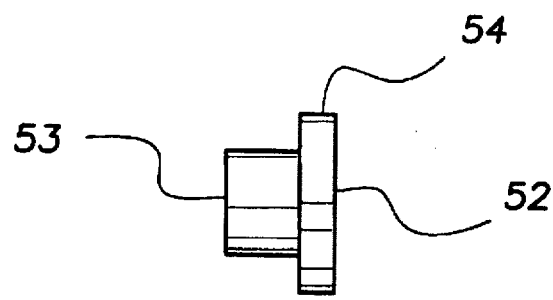
FIG. 4 is a side view of one of the release buttons of the exemplary embodiment of FIG. 1.

Locking mechanism 50 includes four release buttons 51. Referring to FIG. 4, release buttons 51 are plastic cylinders having a first end 52 and a second end 53. First end 52 has a circular flange 54 extending therefrom. Referring back to FIG. 3, circular flange 54 has a diameter greater than the diameter of release button apertures 48. Locking mechanism 50 includes four (4) planer flexible locking prong members 56 having a first fixed end 57 (three not shown) and a free floating hook end 58. Hook end 58 is smaller than locking hook receiving aperture 30 (FIG. 2) permitting the insertion of one hook end 58 into receiving aperture 30. Two first fixed ends 57 are attached to opposing side walls 42a and 42c with adhesive such that each prong member 56 contacts a portion of one and only one circular flange 54 of a release button 51 between fixed end 57 and hook end 58. Flexible prong member 56 flexes allowing hook end 58 to move from a first predetermined position to a second predetermined position as release button first end 53 (FIG. 4) is depressed towards outlet cavity 44.

Figure 5:
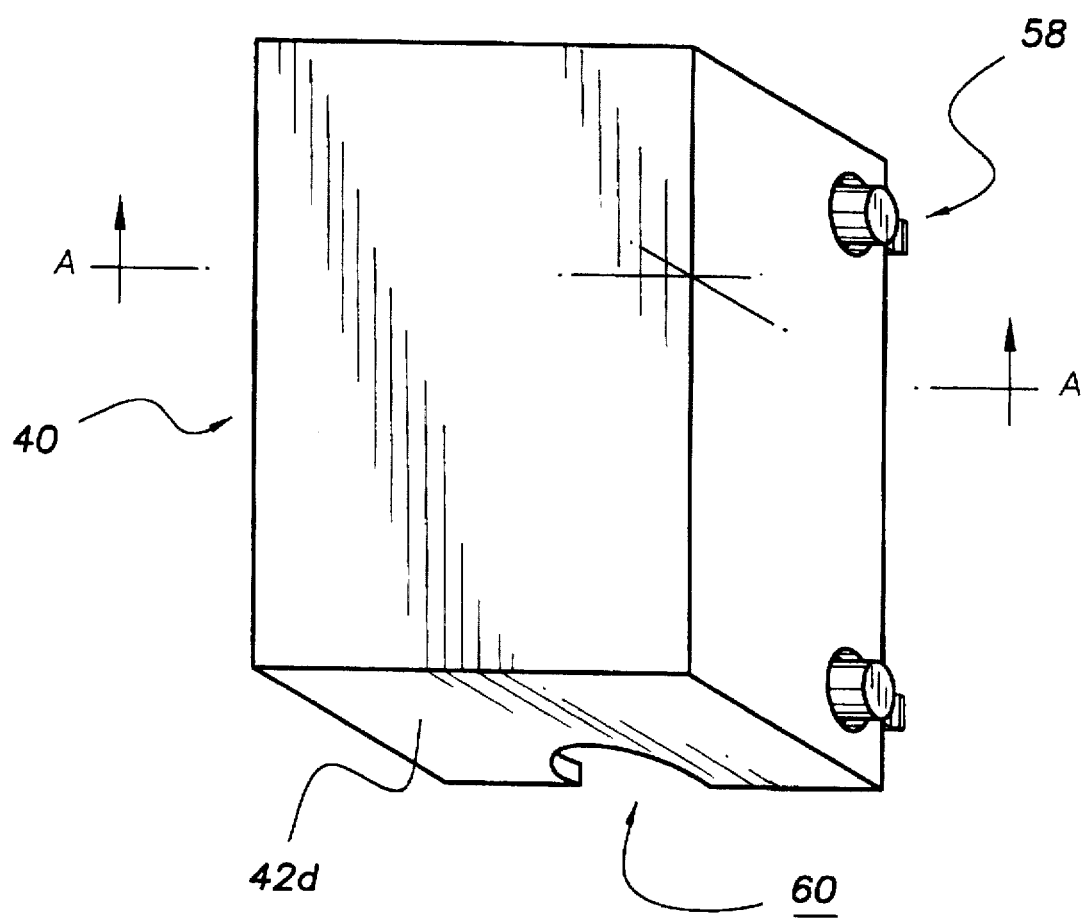
FIG. 5 is a perspective view of the cover and the locking mechanism of the exemplary embodiment of FIG. 1.

Referring to FIG. 5, an alternate view of cover 40 and locking mechanism 50 is shown. Side wall 42d includes a cord passageway 60.

Figure 6:
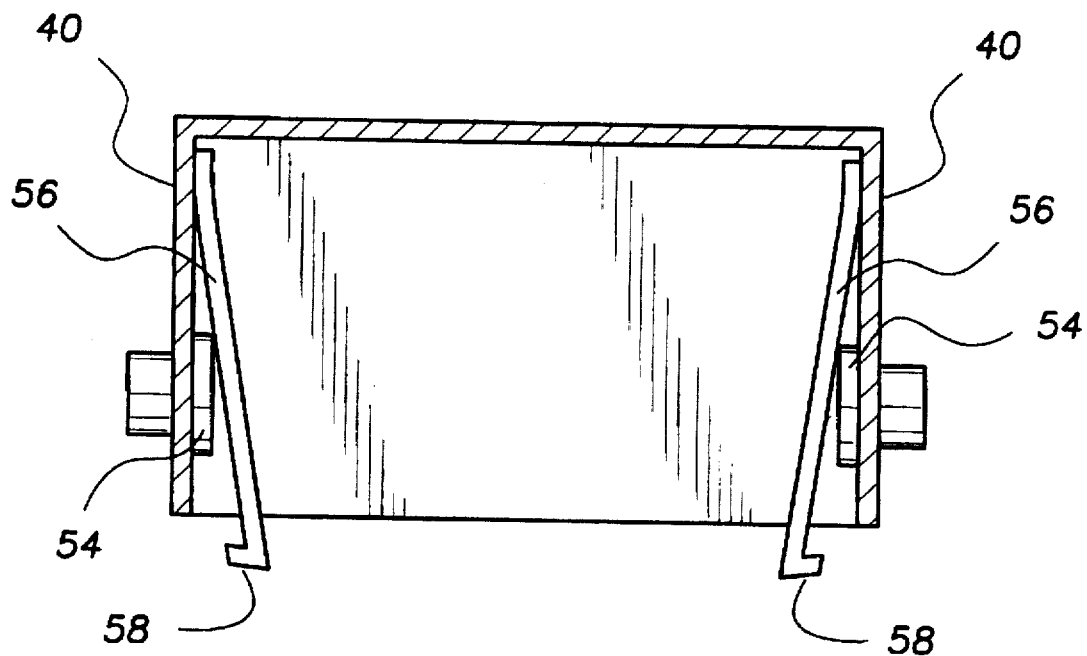
FIG. 6 is a cross sectional view A—A of FIG. 4.

Referring to FIG. 6, a cross sectional view A—A of cover 40 of FIG. 5 is shown with hook ends 58 in the first predetermined position. Circular flange 54 contacts cover 40 and flexible locking prong 56.

Figure 6A:
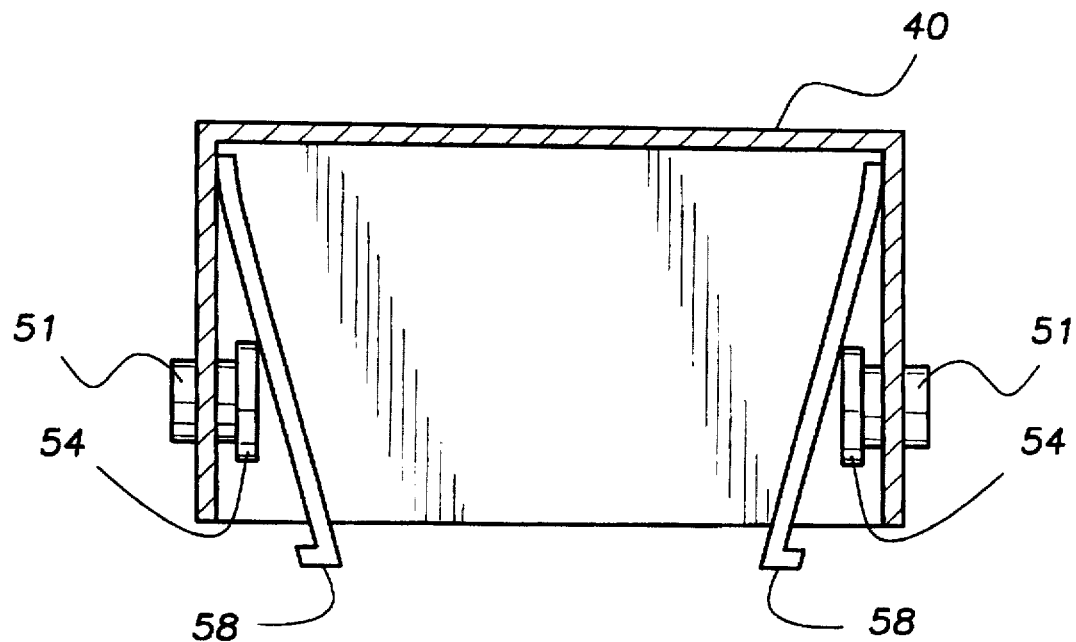
FIG. 6a is a cross sectional view A—A of FIG. 4.

Referring to FIG. 6a, a cross sectional view A—A of cover 40 of FIG. 5 is shown with hook ends 58 in the second predetermined position. Release buttons 51 are slidable within release button aperture 48 (FIG. 3). Circular flange 54 is disposed one-eights inch (⅛") away from cover 40. Operation of the outlet shock protector 10 will now be discussed with reference to the aforementioned drawings. A screw is passed through aperture 21 fastening wall plate 20 to a common electrical receptacle. The electrical receptacle is placed in service by the insertion of electrical devices into the receptacle through receptacle access apertures 22 of wall plate 20. All four release buttons 51 are simultaneously pressed inwardly towards outlet cavity 44 one-eights inch (⅛") thus flexing flexible locking prongs 56 and moving hook ends 58 from the first predetermined position to the second predetermined position. Hook ends 58 are inserted into locking hook receiving apertures 30 as mounting ridge 24 of wall plate 20 is inserted into outlet cavity 44. Distal edges 43a, 43b, 43c, and 43d contact wall plate first face 23 and surround mounting ridge 24 such that lateral movement of cover 40 with respect to wall plate 20 is not permitted. The electrical device cords inserted into the receptacle exit outlet cavity 44 through cord passageway 60. Flexible locking prongs 56 urge locking hooks 58 to the first predetermined position as release buttons 51 are no longer pressed inwardly towards outlet cavity 44. Locking hooks engage mounting ridge planer top second interior surface 27 such that cover 40 may not be removed from wall plate 20 without first pressing release buttons 51 inwardly towards outlet cavity 44 such that locking hooks 58 are in the second predetermined position.

It can be seen from the preceding description that a device for electrical outlets which enhances safety by preventing accidental contact with an electrical outlet, which allows the outlet to be in service while the cover is in place, is readily removable by adults for insertion or removal of electric cords, and may be manufactured efficiently and at low cost has been provided.

It is noted that the embodiment of the electrical outlet shock protector described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An electrical outlet shock protector comprising:

a wall plate attachable to an electrical outlet having a first face, said first face having a raised mounting ridge and at least one receptacle access aperture therethrough, said mounting ridge having a plurality of locking hook receiving apertures;

a cover comprising a top, a plurality of side walls adjoining said top, said side walls each having a distal edge opposite said top, an outlet cavity, said outlet cavity having an opening defined by said side wall distal edges, and a plurality of release button apertures; and a locking mechanism for securing said cover to said wall plate, said locking mechanism comprising a plurality of flexible locking prong members and an equal number of release buttons, said flexible locking prong members engageable with said mounting ridge such that said cover may be removably attached to said wall plate preventing accidental contact with the electrical outlet.

2. The electrical outlet shock protector of claim 1, wherein:

said mounting ridge is insertable into said outlet cavity such that said side wall distal edges contact said wall plate first face.

3. The electrical outlet shock protector of claim 2 wherein:

said top is substantially rectangular in shape corresponding in size to said wall plate first face; and at least one of said cover side walls has a cord passageway therethrough.

4. The electrical outlet shock protector of claim 1, wherein:

each of said flexible locking prong members has a first fixed end and a second free hook end;

said first fixed ends are attached to said side walls within said outlet cavity; and each of said flexible locking prong members project out of said outlet cavity such that with said hook ends in a first predetermined position said hook ends are insertable into said mounting ridge locking hook receiving apertures.

5. The electrical outlet shock protector of claim 4, wherein:

said wall plate first face is substantially rectangular in shape;

said mounting ridge has a planer top having a substantially rectangular outer perimeter; and said locking hook receiving apertures are located on said planer top.

6. The electrical outlet shock protector of claim 5, wherein:

said mounting ridge is insertable into said outlet cavity such that said side wall distal edges contact said wall plate first face.

7. The electrical outlet shock protector of claim 6 wherein:

said top is substantially rectangular in shape corresponding in size to said wall plate first face; and at least one of said cover side walls has a cord passageway therethrough.

8. The electrical outlet shock protector of claim 7, wherein:

said locking mechanism release buttons contact said flexible prong members between said first fixed ends and said second free hook ends; and at least a portion of said release buttons pass through said release button apertures of said side walls.

9. The electrical outlet shock protector of claim 8 wherein:

said release buttons are spaced at least three inches (3") apart.

10. The electrical outlet shock protector of claim 9, wherein:

said outlet cover is constructed from nonconducting plastic.

11. The electrical outlet shock protector of claim 10, wherein:

said release buttons are cylinders each having a first and second end;

said first ends each having a circular flange extending radially therefrom; and said circular flange contacts said cover and said flexible prong members when said hook ends are in the first predetermined position.

* * * * *